US008628011B2

(12) United States Patent
Thibaudeau

(10) Patent No.: US 8,628,011 B2
(45) Date of Patent: Jan. 14, 2014

(54) CARD PERSONALIZATION DEVICE FOR PRODUCING A PORTABLE USB OBJECT, ASSOCIATED CARD, METHOD FOR DETECTING THE TYPE OF CARD, AND USE OF THE CARDS IN A MASS MAILING METHOD

(76) Inventor: Emmanuel Thibaudeau, Duclair (FR)

(*) Notice: Subject to any disclaimer, the term of this patent is extended or adjusted under 35 U.S.C. 154(b) by 0 days.

(21) Appl. No.: 13/389,066

(22) PCT Filed: Aug. 2, 2010

(86) PCT No.: PCT/FR2010/000562
§ 371 (c)(1),
(2), (4) Date: Apr. 19, 2012

(87) PCT Pub. No.: WO2011/015730
PCT Pub. Date: Feb. 10, 2011

(65) Prior Publication Data
US 2012/0193414 A1    Aug. 2, 2012

(30) Foreign Application Priority Data
Aug. 7, 2009    (FR) ...................................... 09 55561

(51) Int. Cl.
*G06K 17/00* (2006.01)
*G06K 7/06* (2006.01)
*G06K 7/08* (2006.01)
*G06K 19/06* (2006.01)

(52) U.S. Cl.
USPC ........... 235/441; 235/380; 235/442; 235/451; 235/486; 235/492

(58) Field of Classification Search
USPC ......... 235/375, 380, 441, 442, 451, 492, 483, 235/486
See application file for complete search history.

(56) References Cited

U.S. PATENT DOCUMENTS

| | | | |
|---|---|---|---|
| 6,439,464 B1 * | 8/2002 | Fruhauf et al. ................. | 235/492 |
| 7,344,072 B2 * | 3/2008 | Gonzalez et al. .............. | 235/441 |
| 7,377,448 B2 * | 5/2008 | Dan et al. ....................... | 235/492 |
| 7,537,169 B2 * | 5/2009 | Gonzalez et al. .............. | 235/492 |
| 8,038,068 B2 * | 10/2011 | Yuzon et al. ................... | 235/492 |

(Continued)

FOREIGN PATENT DOCUMENTS

| | | |
|---|---|---|
| EP | 1843277 A1 | 10/2007 |
| EP | 1825807 A2 | 11/2007 |

(Continued)

OTHER PUBLICATIONS iNETREADY Communications et al., "The Internet Webkey Works Quick N' Easy," Internet citation, Oct. 18, 2006, XP002469290, www.IWEBKEY.COM.

(Continued)

*Primary Examiner* — Tuyen K Vo
(74) *Attorney, Agent, or Firm* — Lowe Hauptman & Ham, LLP

(57) ABSTRACT

A card personalization device for producing a portable USB object having a device that is capable of recognizing cards that are operating according to the ISO standard and cards operating according to the USB standard. The recognition device being coupled to a device for switching the power supply terminals on the contact pads corresponding to the USB or ISO power supply contacts of the card in accordance with the type of the detected card.

19 Claims, 9 Drawing Sheets

(56) References Cited

U.S. PATENT DOCUMENTS

| | | | |
|---|---|---|---|
| 2007/0175994 A1* | 8/2007 | Fruhauf | 235/440 |
| 2007/0252010 A1* | 11/2007 | Gonzalez et al. | 235/492 |
| 2009/0134218 A1* | 5/2009 | Yuzon et al. | 235/382 |
| 2009/0250523 A1* | 10/2009 | Tran | 235/492 |
| 2009/0280865 A1 | 11/2009 | Danis et al. | |

FOREIGN PATENT DOCUMENTS

| | | | |
|---|---|---|---|
| FR | 2877461 A1 | 5/2006 | |
| WO | 2005/031639 A1 | 4/2005 | |
| WO | 2006/072956 A2 | 7/2006 | |
| WO | 2008/068514 A1 | 6/2008 | |

OTHER PUBLICATIONS

International Search Report Completed on Apr. 28, 2011 in International Application No. PCT/FR2010/000562.

International Preliminary Report on Patentability, Chapter II, completed Jan. 20, 2011 in International Application No. PCT/FR2010/000562 with English Translation.

\* cited by examiner

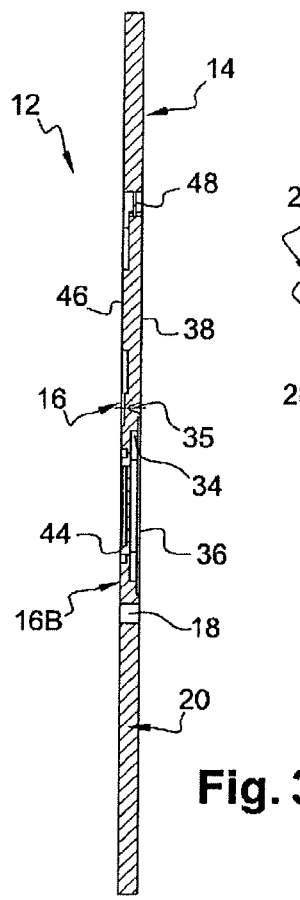
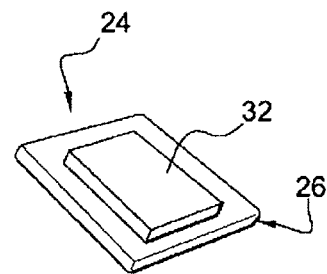
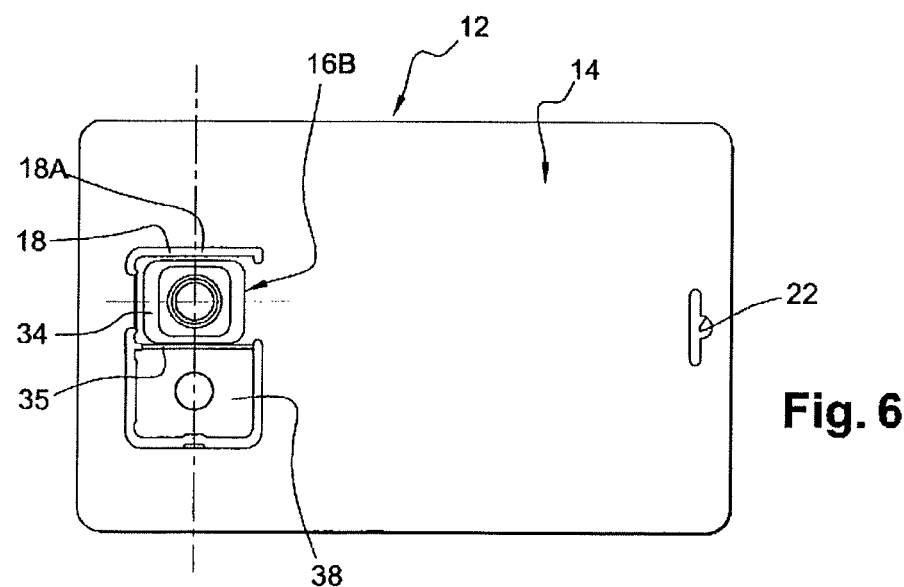
Fig. 3
Fig. 4
Fig. 5
Fig. 6

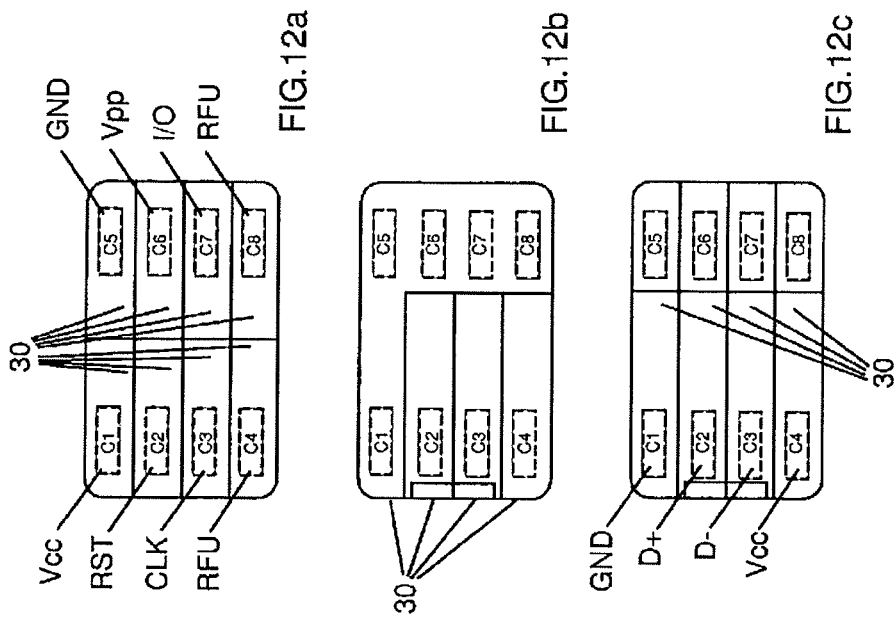
FIG.12a
FIG.12b
FIG.12c
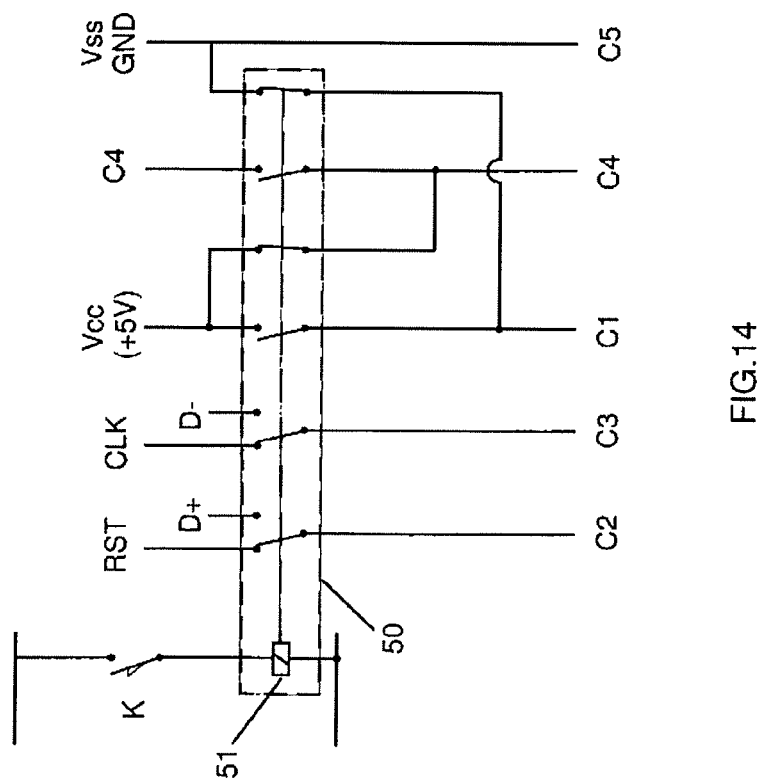
FIG.14

CARD PERSONALIZATION DEVICE FOR PRODUCING A PORTABLE USB OBJECT, ASSOCIATED CARD, METHOD FOR DETECTING THE TYPE OF CARD, AND USE OF THE CARDS IN A MASS MAILING METHOD

RELATED APPLICATIONS

The present application is a National Phase of International Application Number PCT/FR2010/000562, filed Aug. 2, 2012, and claims priority from, French application Ser. No. 09/55561, filed Aug. 7, 2009.

The present invention relates to the field of cards designed to constitute a computer component. A card comprising a body made of plastic including a pre-cut, detachable portion designed to constitute a computer component is already known in the state of the art.

The card is for example a card complying with the ISO 7816 standard, particularly the ISO 7816-1 standard relating to physical characteristics of chip cards. According to this standard the format of the card can be of the ID 1 type (width=54 mm, length=85.6 mm).

The computer component is for example a SIM (Subscriber Identity Module) card with an ID 000 format (width=15 mm, length=25 mm). The ID 000 SIM card is pre-cut from the ID 1 card. The detachable portion constituting the SIM card bears electronic arrangements grouped within a module comprising a first element bearing electrical contacts, constituting connection arrangements, and a second element bearing an electronic chip electrically connected to the electrical contacts. The first element entirely covers the second element when the module is in position in the SIM card.

After cutting out the detachable portion constituting the SIM card, this SIM card is connectable to a host component, such as a portable telephone, to be made operational, that is to provide for example access to data, cryptographic functions and the execution of applications of a telephone service operator.

This type of card including a detachable portion designed to constitute a computer component is manufactured according to proven conventional process, allowing high production rates and volumes, particularly due to the standardization of chip cards complying with the ISO 7816 standard. In addition, a card of the aforementioned type can be easily printed upon by conventional process, particularly in order to personalize it.

It is customarily desired that the card be, on the one hand, relatively rigid in order to avoid folding it, and on the other hand relative light in order to allow it to be sent through postal channels without a weight surcharge.

For this reason, the thickness of the card recommended by the ISO 7816-1 standard is 0.76 mm. Considering the plastics customarily used to manufacture the card, the recommended thickness is sufficient:

to avoid folding the card, and
to limit the weight of the card, even when it complies with the largest format proposed by the ISO 7816 standard, to with the ID 1 format.

Further, since the mid-1990s a strong development has been observed of electronic arrangements including a connection arrangement of the serial transmission computer bus type complying with the USB (Universal Serial Bus) standard.

It is a known practice to integrate a male connector compatible with the USB standard into a card made of plastic, having a length and width complying with the ISO 7816-1 standard, this card constituting for example a storage peripheral (USB key).

However, considering the dimensions of a male connector compatible with the USB standard, the thickness of the card constituting a USB key is considerable and generally exceeds 2 mm, which limits the possibilities for distributing this card through postal channels.

What is more, the male connector compatible with the USB standard is generally removably connected to the card constituting the USB key, so that the manufacture of this card is relatively complicated and cannot be accomplished with conventional manufacturing processes for chip cards according to the ISO 7816 standard.

Also known, through patent application WO 03/027946, is to make detachable electronic keys based on a microcircuit card arranged so as to be able to be directly inserted into a connection port such as for example a USB port. According to one variation in implementation, the part of the key bearing the microcircuit has edges which can be curved by folding or by bending to attain the thickness of a USB connector. However, such keys cannot be produced by manufacturing lines developed for microcircuit cards, the latter not being suited for handling cards with such a thickness.

In addition, USB connectors are not compatible with the ISO 7816 standard. Indeed, a USB peripheral is supplied with power between contact pads C1 and C4, while a chip card according to the ISO 7816 standard is supplied with power through contact pads C1 and C5.

Finally, contact pad C1 corresponds to ground in a USB peripheral and to the "Vcc" terminal on a chip card according to the ISO 7816 standard. Programming such a card therefore requires a specific personalization device, which raises the cost of manufacturing the card and thereby impedes its large-scale distribution.

The present invention has the object of compensating for this problem by proposing a card personalization device designed to constitute a portable USB object exhibiting only slight modification with respect to the personalization devices conventionally used in the field of chip cards.

This goal is attained by a card personalization device designed to generate a portable USB object, having a device capable of recognizing cards operating according to the ISO standard and cards operating according to the USB standard, the recognition device being coupled to a device able to switch the power supply terminals to the contact pads corresponding to the USB or ISO power supply contacts of the card, depending on the type of card detected.

According to a first variation, the recognition device has arrangements able to detect at least one slot on one area of the card.

According to another feature of this variation, the recognition device has arrangements able to detect the presence of a card in the device.

According to another variation, the recognition of the card type is performed through a coupler by analyzing the response of the microcircuit, on at least one contact pad of the connection arrangements of the card, consequent to a particular mode of power supply to the microcircuit.

According to another feature, the card personalization device includes a card loader, arrangements for programming the microcircuit of the card, arrangements for cutting out a personalized outline in the card and printing arrangements.

According to another feature, the device is able to program the chip of the card, to adapt the personalized outline according to a stored file and to carry out personalized printing matching at least to the outline over at least part of the card automatically.

According to another feature, the cutting-out arrangements are milling or punching arrangements.

According to another feature, the cutting-out arrangements are associated with suction arrangements.

According to another feature, the cutting-out arrangements are controlled by computer arrangements, the cutting-out arrangements being able to make a personalized outline based on a particular command file.

The invention also has the goal of proposing a card including a detachable pre-cut portion designed to constitute a portable USB type object, this object having, at least locally, a great thickness, this without excessive increase in the thickness of the card and so as to be able to take advantage, as much as possible, of conventional chip card manufacturing technologies, particularly according to the ISO 7816 standard.

This goal is attained by a card designed to constitute a portable USB object comprising a pre-cut detachable portion designed to form a portable object of the USB type, the detachable portion including at least one microcircuit, a secure nonvolatile memory space, a clock circuit and connection arrangements, the memory space including at least one identifier designed to identify the USB product as being of the human interface device (HID) type, a predetermined URL address or any other command that can be executed by a human interface device, written in ASCII code, an identifier designed to be transmitted with the URL address so as to identify the user, the portable object being, after cutting out the detachable portion, connectable to a USB port to be made operational without adding any specific reading equipment.

According to another feature, the card has arrangements for selecting chip card mode or USB mode operation, at least a dual cabling arrangement, one compatible with the USB type, the other with the ISO type, between the contact pads of the connection arrangements of the card and the microcircuit(s), and arrangements making it possible to switch signals over one of the two cables according to ISO type or USB type operating mode.

According to another feature, the detachable portion includes arrangements embodying a fold line, for example a localized thinning of the card body, this fold line separating two areas called respectively the standing side and the drop side respectively, such that, after cutting out the detachable portion and folding this detachable portion by folding the drop side onto the standing side, the portable object is connectable so as to be made operational.

According to another feature, the standing side and the drop side are provided with matching means for firmly attaching them to one another, preferably of the snap-action type, activated after folding the drop side over the standing side.

According to another feature, the connection arrangements of the card are embodied by a contact pads layout with eight contacts, in ISO 7816 format, each contact pad being electrically isolated from the others, and in that the length of four contact pads is extended so as to correspond with the length of USB type connection arrangements.

According to another feature, the detachable portion is bounded by a linear slot in the body of the card, interrupted by breakable connection arrangements connecting the detachable portion with a portion of the body of the card matching this detachable portion.

According to another feature, the connection arrangements of the card have dimensions and location compatible with the ISO 7816 standard.

According to another feature, the card has a length and a width complying with the ISO 7816 standard and a thickness measured at its periphery preferably greater than or equal to 1 mm, for example comprised between 1 mm and 1.3 mm.

Another goal of the invention is to propose a process for detecting the type of card present in the device.

This goal is attained by a process for detecting a USB type card implemented by a programming coupler, comprising a step for supplying power to the microcircuit in ISO mode, a step for resetting to zero and awaiting the ATR response, a step for supplying power to the microcircuit in USB mode and a step for requesting an identifier, specific to USB products, written into the memory of the microcircuit during its manufacture.

According to another feature, the programming coupler supplies power to the card in ISO mode at contacts C1 and C5 and delivers data on the corresponding ISO contact in the case of an ATR response or supplies power at USB contacts C1 and C4 and delivers the URL address data and the information identifying the USB product as being of the human interface device type to the microcircuit at contacts C2 and C3.

Another goal of the invention is to propose a mass mailing process associating, for example, a product and/or a letter and a card according to the invention.

This goal is attained by an automatic mass mailing process including a step for electrical and/or physical personalization of a chip card, designed to generate a portable USB object, comprising at least the programming of unique and secret information into a memory area of the chip, a step for associating the card with at least one mass mailing letter and a dispatch step characterized in that the secret information contained in the chip is not revealed to the recipient, but allows direct access to an Internet site upon connection of the portable USB object, via a USB port, to a computer host connected to the Internet.

The invention will be better understood upon reading the description that follows, given solely by way of example and made with reference to the drawings wherein:

FIG. 3 is a section view along line of FIG. 2, the electronic arrangements of the card not being shown;

FIGS. 4 and 5 are perspective views of the electronic arrangements of the card before their assembly on the card, FIG. 5 showing the electronic arrangements in a position that is reversed with respect to their position in FIG. 4;

FIGS. 6 and 7 are views analogous to FIG. 1 showing the condition of this card during different steps of manufacture of this card;

FIGS. 12a through 12c are examples of implementation of ISO contact pads layout constituting connection arrangements.

FIG. 14 is a variation of implementation of a modification scheme of a personalization device

Figure 1:
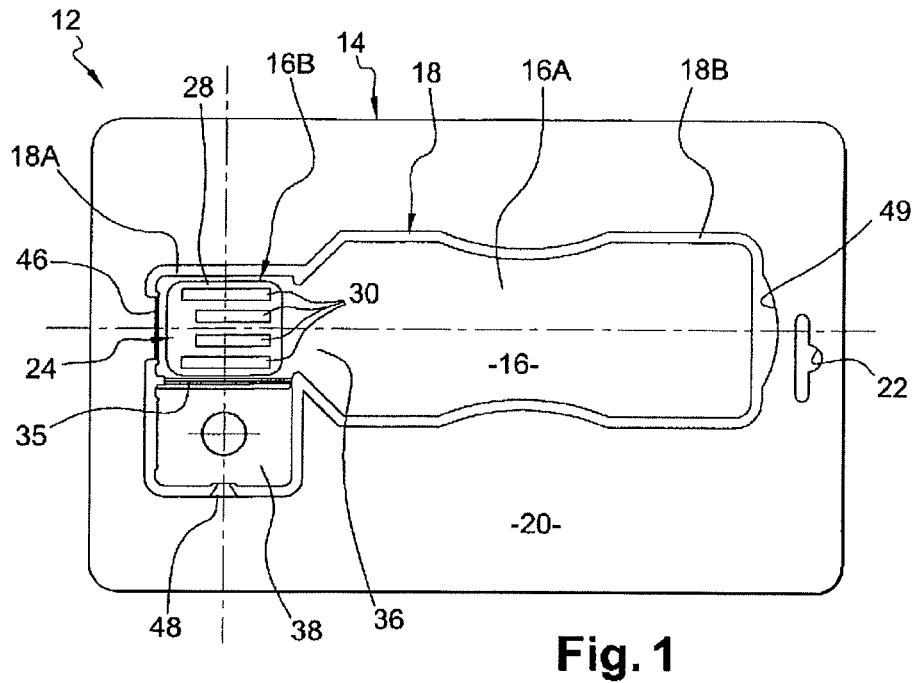
FIGS. 1 and 2 are views of the front and back faces, respectively, of a card according to one embodiment of the invention.
Figure 2:
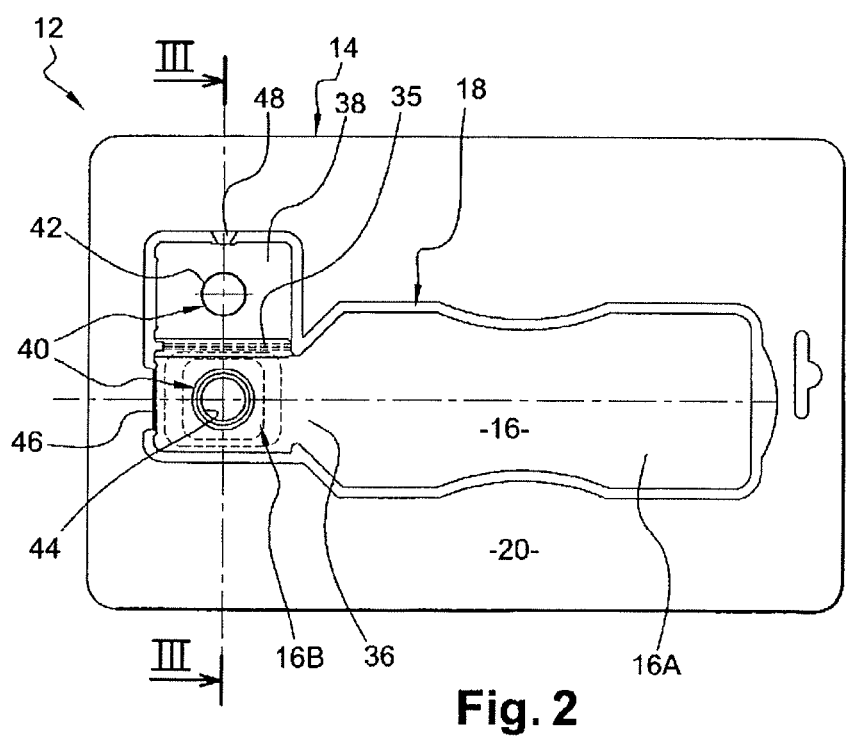

Shown in FIGS. 1 through 3 is a card according to one embodiment of the invention, designated with the general reference number 12.

This card comprises a conventional body (14) made of plastic, for example ABS (Acrylonitrile Butadiene Styrene) or PVC (Polyvinyl Chloride). According to one variation in implementation, the body (14) of the card (12) can be made of biodegradable material. The card (12) (or the body 14) is bounded by two opposite faces called respectively front (visible in FIG. 1) and back (visible in FIG. 2). The body 14 comprises a pre-cut detachable portion (16) designed to constitute a computer component (17).

The detachable portion (16) is bounded by a linear slot (18) provided in the body (14) of the card. This linear slot (18) is interrupted by breakable connection arrangements (described in greater detail later) connecting the detachable portion (16) with (20) a portion (20) of the card body matching this detachable portion (16). It will be noted that the portion (20) of the body (14) of the card can include a slot (22) constituting an eyelet for suspension the card, for example by means of a rigid hook or a flexible link.

In the embodiment shown, the card (12), more particularly the body (14), has a length and width complying with the ISO 7816 standard, particularly with the ISO 7816-1 standard relating to physical characteristics of chip cards. More particularly, the card (12) has a width of about 54 mm and a length of about 85.6 mm corresponding to the ID 1 format defined by the ISO 7816 standard. Of course, this embodiment is in no way limiting and the dimensions of the card can correspond to the ID 00 format or any other future standardized format.

The thickness of the card, measured at its periphery, (that is at the periphery of the body (14)), is preferably greater than or equal to 1 mm, for example comprised between 1 and 1.3 mm. The thickness of the card (12) is therefore slightly greater than the recommendation of the ISO 7816 standard. The detachable portion (16) bears the electronic arrangements (24) shown in more detail in FIGS. 4 and 5. In these FIGS. 4 and 5, the electronic arrangements (24) are separated from the body 14 of the card.

In the embodiment shown in FIGS. 4 and 5, the electronic arrangements (24) are grouped within a module (26) comprising a first element (28) generally of dielectric material, bearing, on one of its faces, electrical contact pads (30) constituting connection arrangements, and a second element (32) bearing an electronic chip located directly above the contact pads with which it is electrically connected.

The electronic chip can include, for example, a microcircuit (53), as for example and without limitation a microprocessor, a USB controller, a microcontroller or a microcalculator and one or more secure nonvolatile memories (55) incorporated or not into the microcircuit (53). Unlike the case of conventional chip cards, the clock signals of the USB type peripherals are not transmitted by the USB connector; the chip will therefore have its own clock circuit (54), incorporated or not into the microcircuit (53). This clock circuit (54) can, for example and without restriction, include a resonator or a quartz crystal.

The module (26) is assembled in a manner known per se in a stepped recess (34) provided in the front face of the body (14) of the card (see FIG. 3). The recess can, for example, have two steps, one wherein the chip is inserted and another receiving the contact pads (30). To be compliant with the ISO 7816 standard, the module (26) will be assembled such that the contact pads (30) are at the same level as the front face of the body (14) of the card.

The first element 28 of the module (26) can include, for example, a printed circuit board or PCB on which metalized traces are made constituting electrical contacts (30) as shown in FIG. 4.

According to another embodiment, the contact pads (30) are embodied by a contact pads layout having eight contacts in ISO format as illustrated in FIGS. 12a through 12c. Unlike the contact pads layouts customarily used on a chip card, as for example that shown in FIG. 12a, the contact pads corresponding to ISO contacts C1 through C4 have been extended so as to make the dimensions of the contact pads of the layout correspond to those of a USB connector while still satisfying the 7816-1 standard relating to the dimensions and position of contacts. To that end, the length of the contact pads corresponding to ISO contacts C5 through C8 has been shortened. A USB connector includes only four traces; the contact pads corresponding to ISO contacts C5 through C8 will therefore not be used. According to a first embodiment, shown in FIG. 12c, these contact pads will each be isolated from one another but will not be cabled to the microcircuit. According to another embodiment, shown in FIG. 12b, the contact pads corresponding to ISO contacts C5 through C8 can be isolated from ISO contacts C2 through C4 but will not be isolated from one another and will be connected to ISO contact C1 so as to constitute a single contact pad. In this embodiment, when power is supplied to the card, the presence of a dead short circuit between ISO contacts C1 and C5 will be detected before the module is energized.

In FIGS. 12a through 12c, the locations of the standardized contacts have been shown dotted. In FIG. 12a, the function of each standardized ISO contact is specified. Likewise, in FIG. 12c, the function of the standardized USB contact has been specified.

The second element (32) of the module (26) includes, for example a QFN (Quad Flat Package No lead) package containing the electronic chip. As a variation, the QFN package including the electronic chip can be replaced by an integrated circuit. The chip can, for example and without limitation, include a microcalculator, a microcontroller or any other microcircuit, a resonator integrated or not into the microcircuit and one or more secure nonvolatile memories (55) integrated or not into the microcircuit (53).

It will be noted that, when the module (26) is in place in the card (12), the first element (28) covers, preferably completely, the second element (32) so that the first element 28 and hence the electrical contacts (30) are flush with the front face of the card (12).

The detachable portion (16) includes arrangements embodying a fold line (35). In the example shown, the fold line (35) is embodied by a localized thinning of the body (14) of the card. This thinning can, for example and without restriction, be accomplished by punching, by milling, by laser cutting or any other machining process.

It will be noted that the fold line (35) separates two areas respectively called the standing side (36) and the drop side (38).

Figure 9:
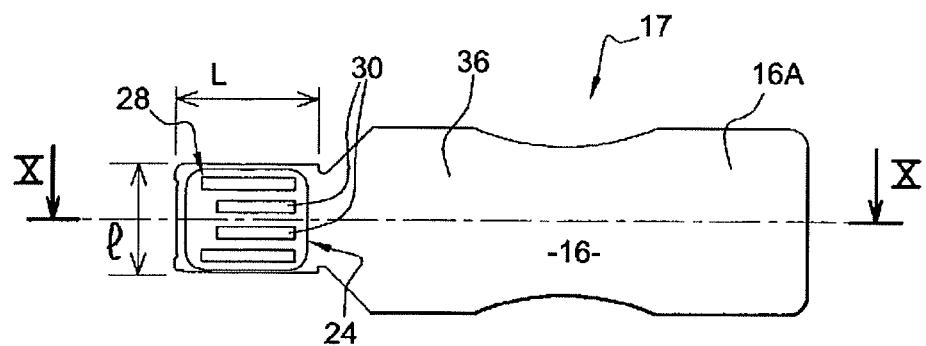
FIG. 9 is a top view of the computer component manufactured in conformity with the process according to the invention based on the card shown in FIGS. 1 through 3.
Figure 10:
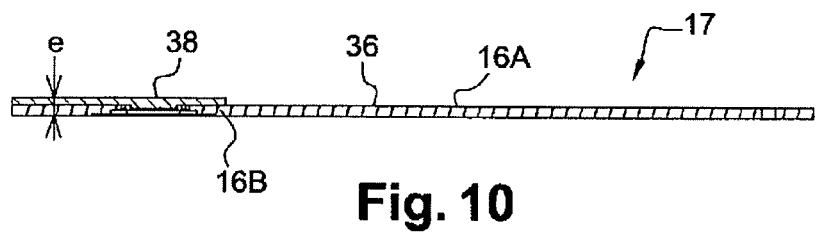
FIG. 10 is a section view along line X-X of FIG. 9.
Figure 11:
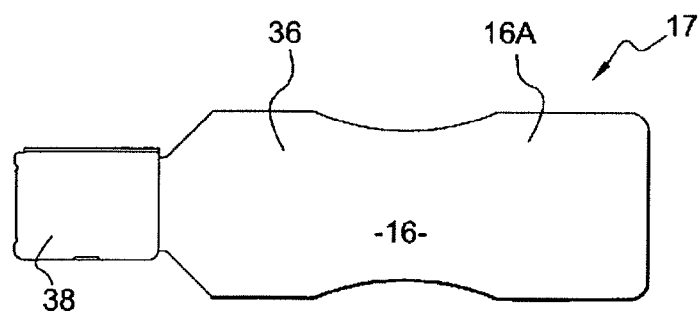
FIG. 11 is a bottom view of the computer component shown in FIG. 9.

After cutting out the detachable portion (16) and folding of this detachable portion (16) by folding the drop side (38) onto the standing side (36), the computer component (17) has a configuration as shown in FIGS. 9 through 11. Folding the drop side (38) onto the standing side (36) makes it possible to give the part present under the connector a thickness compatible with the dimensions of a female USB connector. In this configuration, the portable object (17) can be connected to a computer host, such as a host office computer, a host pocket computer, an intelligent portable computer (Smartphone) or any other computer terminal having a USB or mini-USB port, to be made operational, without adding any specific reading equipment, such as a card reader for example. In the case of a mini-USB port, a USB/mini USB adapter could be necessary.

In the embodiment shown, the connection arrangements of the electronic arrangements (26) are of the serial transmission computer bus type, preferably complying with the USB (Universal Serial Bus) standard. Thus, referring to FIGS. 9 through 11, it is seen that the standing side (36) and the drop side (38) have outlines and dimensions designed to form, with the connection arrangements including the electrical contacts (30), a male connector compatible with the USB standard, this after folding the drop side (38) onto the standing side (36).

It will be noted that the fold line (35) does not extend beyond the detachable portion (16). In particular, the fold line (35) does not extend into the part (20) of the body (14) of the card. This prevents an undesired folding of the card (12) as a whole.

In order, after folding the detachable portion (16), to hold the drop side (38) against the standing side (36), the standing side (36) and the drop side (38) can be provided with complementary arrangements (40) for firmly attaching them together, preferably of the snap action type.

The snap arrangements (40), provided in the back face of the card (12) are activated after folding the drop side (38) onto the standing side (36). The snap arrangements (40) include, for example, a male element that may consist of a stud (42), provided in the drop side (38), designed to cooperate by snap action with a female element (44) that may consist of an annular raised band, provided in the standing side (36). According to another embodiment, the female attachment element is formed on the drop side and the male attachment element is formed on the standing side.

Preferably, the detachable portion (16) includes an area (16A) with a personalized outline and an area (16B) constituting a substrate for the electronic arrangements (24). In the example illustrated, the standing side (36) includes the area constituting the substrate (16B) and, preferably, the personalized outline area (16A). It will be noted that the breakable connection arrangements, connecting the portions (16) and (20) of the body (14) are embodied, on the one hand, by a breakable thinned portion (46) connecting the portion (20) with the area (16B) constituting a substrate and, on the other hand, by a breakable bridge (48) connecting the portion (20) with the drop side (38).

Thus, in the example illustrated, the personalized area (16A) of the detachable portion (16) is connected to the portion (20) of the body (14) only through the area (16B) serving as a substrate for the electronic arrangements. The personalized area (16A) can, in this manner, advantageously constitute a paperclip allowing in particular one or more sheets of paper or of cardboard or any other thin object between this personalized area (16A) and the portion (20) of the body (14) of the card.

According to one variation in implementation, not shown, the personalized area (16A) can include breakable connection arrangements connecting it to a portion (20) of the body (14) of the card matching this personalized area (16A).

Contrary to the conventional choice of the person skilled in the art, the invention does not increase the thickness of the card to match it to the dimensions of the computer component in its connectable state.

On the contrary, the invention teaches to distribute the final thickness of the computer component between the standing side and the drop side of the card. The final thickness of the computer component is obtained, after folding the detachable portion of the card, by summing the thicknesses of the standing side and of the drop side.

Furthermore, the invention provides, unlike the conventional recommendation, for folding part of the card, to with the detachable portion of the card, this so as to allow a computer component having the desired thickness to be obtained.

Finally, it will be noted that, thanks to the invention, the weight of the card remains limited because the thickness of this card remains limited, so that the card can easily be distributed through postal channels.

The card 12 according to the invention is very easy to manufacture. The principal steps of manufacture of this card connected with the invention will be given below. Preferably, the manufacture of the card will incorporate as many steps and machines of the conventional chip card manufacturing process as possible so as to reduce its manufacturing costs.

First of all, a step is carried out for molding, by injection for example, the body (14) of the card using conventional arrangements in order to obtain a configuration of the body (14) as shown in FIG. 6. During this molding step, only part (18A) of the linear slot (18) is formed, as shown in FIG. 6. In this configuration of the body (14) of the card, only the area serving as a substrate (16B) of the detachable portion is made with its attachment means. The drop side (38), however, is fully formed. According to this embodiment, the mold also includes the form of the slot (22). The configuration illustrated in FIG. 6 is in no way restrictive and the card, after molding, can for example not include the slot (22).

According to one variation in implementation, during the molding step, the full linear slot (18) is made, thus delimiting the standing side (36) and the drop side (38) as well as the personalized shape (16A). The mold can also include the form of the slot (22).

Figure 7:
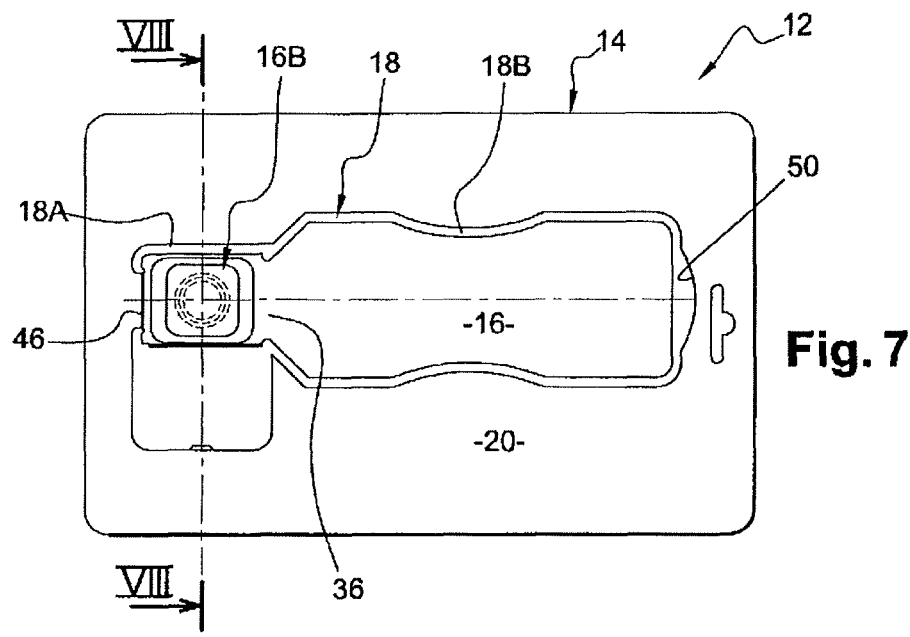

Preferably, after molding the body (14) of the card in the configuration shown in FIG. 6, the personalized outline area (16A) is formed by extending the part (18A) of the linear slot with a part (18B) of this linear slot delimiting the area (16A) (see FIGS. 1 and 7). The part (18B) of the linear slot is the result of cutting out the personalized outline area (16A) using arrangements selected, for example, from among conventional punching arrangements, conventional laser cutting arrangements or conventional milling cutting arrangements.

The cutting arrangements can, for example, be connected to computer arrangements making it possible to machine the personalized outline (18B) according, for example, to a computer file supplied by computer-aided design software so as to represent, for example and without limitation, a particular logo or shape. According to another embodiment, the computer arrangements include a scanner or any other type of digitizing equipment, and are able to digitize a shape or an image and to transcribe it into digital commands capable of controlling the cutting arrangements.

Furthermore, the module (26) wherein the electronic arrangements (24) are grouped is manufactured according to a process that is known per se. The chip is placed on the face of the first element (28) not bearing the electrical connection arrangements (30). The electrical contacts of the chip are then electrically connected to the connection arrangements (30). FIGS. 12a through 12c show different embodiments of contact arrangements. In the case of use of an ISO layout having eight contact pads, only the contact pads bearing ISO contacts C1 through C4 can be cabled to the microcircuit.

Following the cabling step, a resin can be deposited on the chip so as to encapsulate the latter and the connections to the different contacts.

A slot is made in the card so as to form a stepped recess (34). According to another embodiment, the stepped recess is made during the step for molding the card. The module (26) is then placed in the stepped recess (34) and attached permanently to the body (14) of the card, for example using a conventional adhesive during an inlaying step. By preference, the location of the stepped recess (34) will be chosen such that once the module (26) is placed, the location of the contact pads will be compliant with the ISO 7816-2 standard.

After assembly of the module (26), the chip is programmed. This programming step is made for storing in one or more memory spaces of the chip at least the address of the Internet site to which it is desired to have the portable object connect or any other command that can be executed on a human interface device, a unique identifier allowing identification of the user, for example, during connection to the Internet site, one or more operating programs of the microcircuit and USB identifiers allowing the portable object to be recognized as an HID (Human Interface Device) by the operating system of the terminal to which it will be connected. The human interface device can, for example and without limitation, be a keypad. The command executed by the portable object (17) can for example be connection to an Internet site the address whereof is stored in a memory space of the microcircuit, sending an email message to an address stored in a memory of the microcircuit, or any other command that can be executed on a human interface device.

It will be noted that, unlike a conventional chip card such as a banking card for example, the portable object does not have an on-board operating system, but instead uses the operating system of the terminal to which it connects.

According to one embodiment, which is in no way restrictive, the chip of the card is programmable only once and cannot be reprogrammed. Once the data are entered (Internet address, identifiers, microcircuit operating programs . . . ) these can no longer be changed. Likewise, it is not possible to add information after programming of the chip is completed.

According to another embodiment, the card chip is reprogrammable. By preference, only the URL address or the pre-programmed command will be reprogrammable and the operating program of the card will not be modifiable. This option can be useful, for example and without restriction, during a demonstration. Before the demonstration the card's chip will for example be reprogrammed with a URL address specially created for this demonstration. Once the demonstration is finished, the card's chip can be reprogrammed, for example for another demonstration using another URL address or another command to be executed by the portable object (17). This makes it possible to re-use the portable object (17) and thus to avoid discarding it after each demonstration.

By preference, the programming of portable objects is carried out with the same manufacturing and programming tools used in the field of conventional chip cards, as for example and without restriction that of banking cards. In order to be programmable in such machines, the portable objects are equipped with a connector that may be a contact pads layout according to the ISO standard, as shown in FIGS. 12a through 12c.

In the case of a connector according to the ISO standard, power is supplied to the chip on contact pads C1 (Vcc) and C5 (GND). In the case of a connector according to the USB standard, contact C1 corresponds to ground and the Vcc contact is on contact pad C4. The positive polarity being on C4 in USB mode and on C1 in chip card mode, the USB connector and the ISO 7816-2 standard are therefore incompatible. Moreover, with the form of the USB connector of the card, according to FIG. 12a, the ISO connector of the programming device is short-circuited. Likewise, the programming of the card is carried out on ISO contacts C2 and C3 (respectively D+ and D−) in USB mode, but is carried out on the ISO input output (I/O or Input/Output) contact C7 in chip card mode, contacts C2 and C3 corresponding respectively to the reset-to-zero (RST for Reset) contact and to the clock signal (CLK for Clock) contact. In order to correct this problem, the personalization device is modified by cabling and/or by programming.

According to a first embodiment, the ISO connector of the personalization device is modified. Only contacts C1 through C4 are retained and contacts C5 through C8, not used in USB mode, are withdrawn. Thus any danger of a short-circuit is avoided and chip card programming tools can be used to program USB type cards. However, this solution only allows USB type cards to be programmed.

According to a variation in implementation, in order to be able to program USB type and ISO type cards on the same personalization device, the personalization device is equipped with a device for recognizing the type of card present inside the programming device.

According to a first embodiment, the recognition device will detect the presence of a card bearing a portable object by detecting the presence or absence of a slot area on the card. Indeed, unlike a card according to the invention, a conventional microcircuit card, such as for example a banking card, is solid and does not include any slot. SIM cards for portable telephones, in ID 000 format integrated in ID1 format cards, include slot areas, but these do not exist for example around the area constituting the drop side (38) and the standing side (36). This recognition device can, for example and without limitation, be embodied by a device (K1) of the "limit switch" type coupled with a device (K2) of the "photoelectric barrier" type. The "limit switch" device (K1) generally present on most chip card personalization devices will detect the presence of a card inside the machine. The "photoelectric barrier" type device (K2) will include, for example and without limitation, a photosensitive element, such as for example a photodiode or a phototransistor, placed directly above an element emitting a beam of light, such as for example an infrared or laser light-emitting diode. This device will be placed so as to detect a slot common to all cards bearing the portable object according to the invention. This slot can, for example, correspond to the element 18A or the element 22. According to a variation in implementation, the detection of a slot on the card will be carried out by a feeler switch (K2) or "limit switch".

The card type recognition device is coupled to a switching device (50) making it possible to supply power to the card between contacts C1 and C5 when an ISO type card is detected and between contacts C1 and C4 when a USB type card is detected.

The switching device can, for example and without limitation, be embodied by a six-way relay (50) as shown in FIG. 13 or 14. The detectors (K1, K2) are connected between the power supply and the relay coil (51). A first contact, of the "normally opened" type, connects the "Vcc/+5V" pole to connector C1 of the personalization device. A second contact, of the "normally closed" type, connects the "C4" pole to connector C4 of the personalization device. A third contact, of the "normally opened" type, connects the "Vcc/+5V" pole to connector C1 of the personalization device. A fourth contact, of the "normally closed" type, connects the "Vss/GND" pole to connector C1 of the personalization device. It will be noted that the "Vss/GND" pole is cabled to connector C5 of the personalization device. The coil (51) of the relay (50) also controls two commutators allowing connectors C2 and C3 of the personalization device to be switched either to the "D+" and "D−" poles or to the "RST" and "CLK" poles, respectively.

Figure 13A:
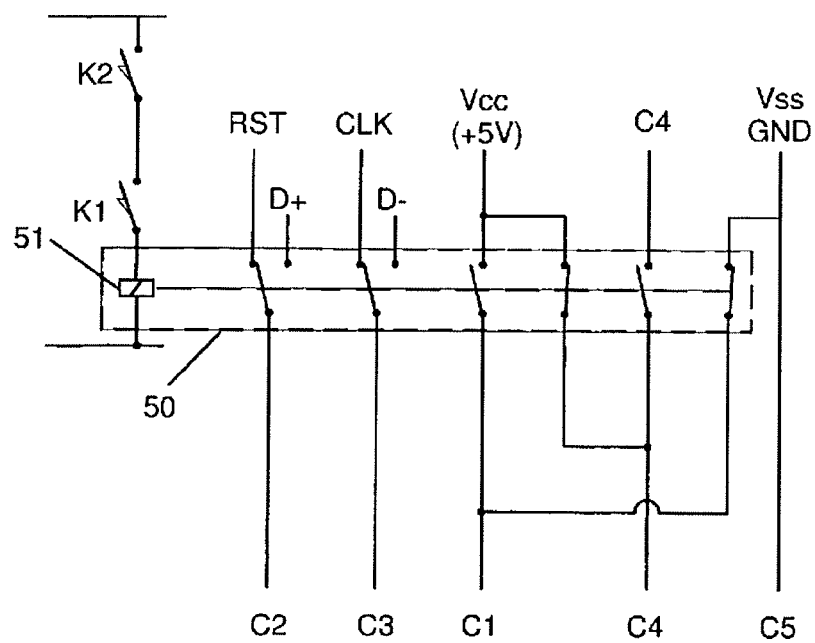
FIGS. 13a and 13b show an example of a modification scheme of a personalization device in the presence of a card of the ISO or USB type.

Referring to FIG. 13a, when a conventional chip card is inserted into the personalization device, the two switches (K1, K2) are closed and the coil is energized. Connector C1 of the personalization device is electrically connected to the "Vcc/+5V" pole and the card is supplied with power between ISO contacts C1 and C5 in compliance with the 7816 standard. Contact C4 is also connected to pole C4 of the personalization device. Contacts C2 and C3 are respectively connected to the "RST" and "CLK" poles.

Figure 13B:
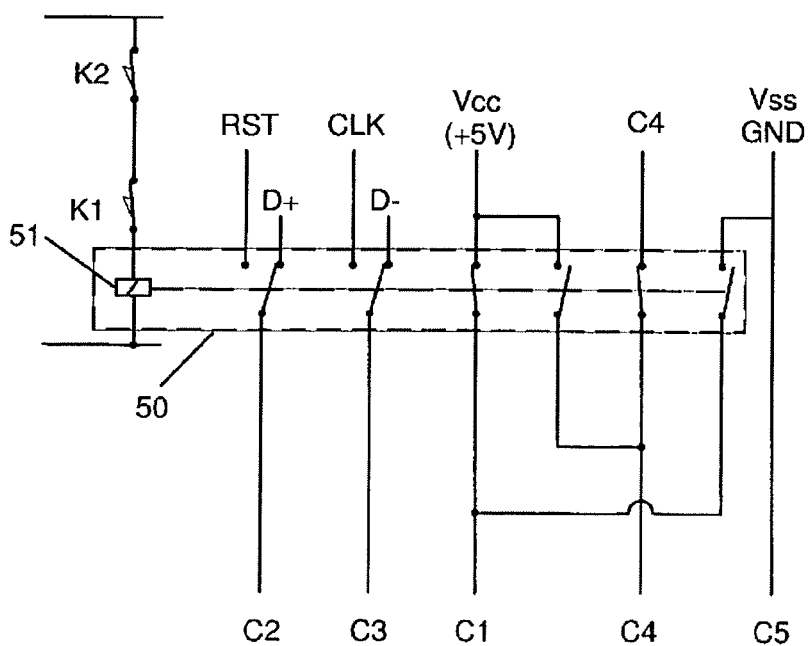

Referring to FIG. 13b, when a USB type card is inserted into the personalization device, the coil (51) is not energized. Connector C1 of the personalization device is electrically connected to the "Vss/GND" pole and power is supplied to the card between ISO contacts C1 and C4 in compliance with the USB standard. Contacts C2 and C3 are respectively connected to the "D+" and "D−" poles, thus allowing programming of the microcircuit through these two contacts.

In this embodiment, the contact pads layout constituting the connection means of the card must have its eight pads isolated as shown in FIG. 12c.

According to a variation in implementation, shown in FIG. 14, the card recognition device uses only a single detector (K). In this embodiment, the card presence detector (K) is repositioned above one of the slot areas present only on USB type cards. Thus, when no card is detected, either there is no card in the personalization device or a USB card is inserted there. The absence of a card allows contact C4, from the connector of the personalization device, to be electrically connected to the "Vcc/+5V" pole and contact C1 to be connected to the "Vss/GND" pole. It also allows contacts C2 and C3, from the connector of the personalization device, to be electrically connected respectively to the "RST" and "CLK" poles.

According to another preferred embodiment, the personalization device includes a programming coupler. The advantage of the use of a programming coupler is that it is easier to put into place. Indeed, this embodiment requires no mechanical modification to the personalization device. Only the operating program of the coupler must be modified. During programming of the chip, the electrical signals C1 through C8, emitted by the personalization device, are no longer directly connected to an eight-pin connector but run first through a coupler. The signals can therefore be redirected in software toward the desired pin of the connector. Depending on the kind of card detected, the coupler's program will route the power supply signals either to the ISO contacts C1 and C4 or toward contacts C1 and C5. Likewise, the electrical personalization data will be directed either toward the ISO contact C7 or toward ISO contact C2 and C3. In similar fashion, contacts C2 and C3 will receive either signals corresponding to inputs/outputs if a USB type card is detected or reset signals and clock signals if a conventional chip card is detected.

Figure 16:
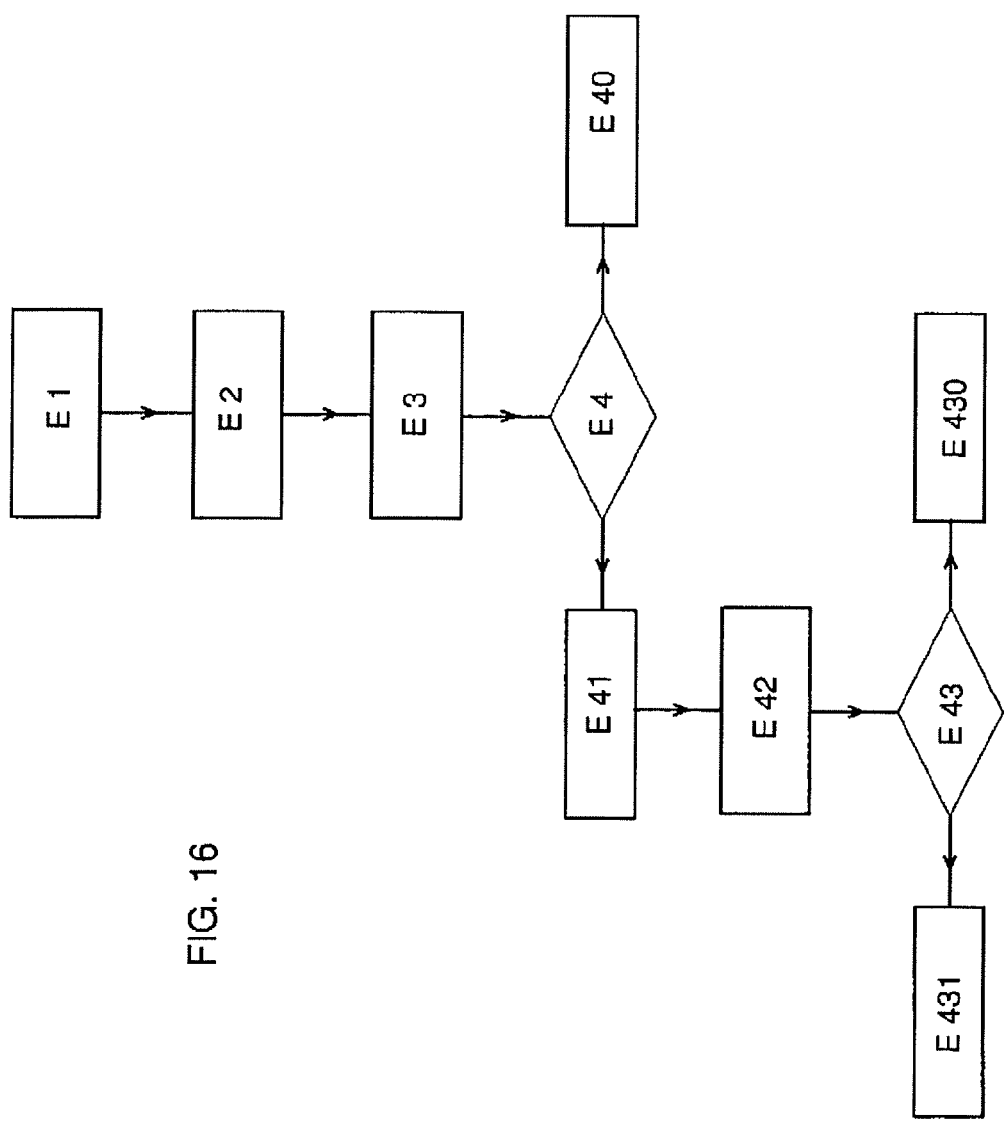
FIG. 16 is an example of a flowchart showing the steps in detection of the card type by a programming coupler.

In this embodiment, recognition of the card type will be carried out by the coupler's program which will detect the presence of a card bearing a portable object by attempting to supply power to the card's chip the pre-programmed test operations. FIG. 16 shows the different steps of the coupler's recognition program. Firstly, after having detected the presence of a card inside the device (E1), for example and without restriction by a device of the "limit switch" type present in the majority of microcircuit card personalization devices, the coupler supplies power to the card according to the ISO standard (E2), that is by applying a voltage between the ISO contacts C1 (Vcc) and C5 (GND). It performs a reset (E3) on ISO contact C2 and awaits a response of the "ATR" (Answer To Reset) type (E4) from the card's microcircuit on the ISO input/output contact C7. If the coupler receives the "ATR" response, it recognizes the card as being a conventional chip card (E40) and the device does not program its chip, or [does so] only in "chip card mode," that is by using ISO contact pad C7 corresponding to the "input/output" contact. If the coupler detects no electrical signal on ISO contact C7 (I/O), it carries out a second function test by applying a power supply voltage between the contact pads corresponding to ISO contacts C1 and C4 (E41). We recall that in the case of a card according to the invention, the contact pads corresponding to ISO contacts C5 through C8 are not cabled to the microcircuit and each contact pad is isolated from the others.

Once the card is energized, the coupler will send a request (E42) in the contact pads corresponding to ISO contacts C2 and C3 (D+ and D− respectively) to ask for an identifier specific to each USB product, as for example and without limitation the vendor identifier (Vendor ID) and/or the peripheral identifier (Device ID), and/or the product identifier (Product ID). The coupler will await a response from the microcircuit on contacts D+ and D− (E43). If the recognition device receives the specific identifier on contacts D+ and D− then the chip is programmed in "USB mode" (E431), that is using contacts D+ and D−. If no response is received, then the card is recognized as defective or of another type and no action is performed (E430).

The advantage of this procedure, using a programming coupler, is that on the same machine it is possible to program a conventional chip card or a USB type card. In addition, if the machine has several programming heads, the programming of these two types of card can be carried out at the same time.

After electrical personalization of the card, a step for physical (graphic) personalization can be performed. Printing is performed on at least one face of the card, for example on the front face of the card. Printing is carried out by conventional means, as for example and without limitation, a sublimation printer, screen printing arrangements, and includes for example personalized decoration and/or personalized text.

After assembling the module 26 to the body of the card, printing the card and cutting out the personalized area (16A) of the detachable portion (16), a card (12) is obtained in the configuration illustrated in FIGS. 1 through 3 allowing its distribution to consumers.

The order of the steps in the manufacturing process is in no way restrictive and [they] can be carried out in a different order. For example, the assembly of the module (26) onto the body (14) of the card can be carried out after printing the card and/or before cutting out the personalized area (16A) of the detachable portion (16).

The electrical personalization step can also be carried out in two steps. For example, in a first step, the program(s) are stored in a memory area of the chip, integrated or not into the microcircuit, and in a subsequent step the user identifier and, for example, the Internet address or any commands that can be executed by a human interface device, or, according to one variation in implementation, only the Internet address or any other commands that can be executed by a human interface device, are programmed into a memory area of the chip.

Likewise, the step for cutting out the personalized outline can, for example, be incorporated into the physical personalization step.

According to a variation of implementation, the manufacturing process can be performed in two series of steps.

Firstly, for example in the factory, the card is molded according to a molding step identical to that described previously.

The module is then assembled and inserted into a stepped cavity (34) made in the card.

The chip, during its manufacture, is then partially programmed. During this partial programming step, only the operating program of the microcircuit and/or a circuit identifier is stored in the memory space of the chip.

Secondly, the identifiers allowing recognition of the portable object (17) as a USB peripheral of the human interface device type, the user identifier is programmed into a memory space of the chip as well as the Internet address or URL (Uniform Resource Locator).

A physical personalization step is then carried out, during which the personalized outline (18B) is cut out and printing, on at least part of the card, is performed.

This manufacturing process, in two series of steps, can for example be used for small production volumes. It can, for example and without limitation, be used by retail banners or other stores. The store buys pre-personalized cards and, at the time of purchase of a product by a customer, the salesperson finishes personalizing the card. During this personalization step, the salesperson programs the Internet address relating to the product purchased as well as the user identifier, and associates this identifier with the customer, for example in the store's customer database. During this step, the salesperson can also cut out and print the personalized outline, for example and without restriction with the image of the logo of the product that was purchased.

To carry out this step, the salesperson can have available an automatic card personalization device connected, for example, to computer arrangements. This device can for example include a card hopper designed to store pre-personalized blank cards and to supply the device with cards to be fully personalized. According to another embodiment, the device is manually fed by the user.

The device will include programming arrangements capable of storing at least an Internet address and a user identifier in a memory area of the card's chip. This device will also include arrangements for cutting out, for example and without limitation by milling, laser cutting or punching and printing arrangements capable of printing an image and/or text, personalized and matched to the personalized outline (18B), over at least part of the card.

According to one embodiment, the personalization can for example include printing in Braille on at least one face of the portable object (17).

The milling arrangements can, for example, be associated with suction arrangements. The cutting-out and/or printing arrangements can, for example, be controlled by computer arrangements so as to cut out and print the card according to files stored, for example, in a database or a memory space of the computer arrangements. According to another embodiment, the personalization device is programmed to carry out only one personalized shape and a single printing design the parameters whereof are recorded, for example, in a memory of the device.

Each portable object (17) possesses a microcircuit with a unique serial number. This serial number is guaranteed by the manufacturer and makes each microcircuit unique. This uniqueness of the microcircuit can for example be used to prevent [the making of] pirate copies by cloning for example. Before programming the microcircuit, the programmer can, for example check the serial number of the microcircuit and check in a database of the manufacturer, for example and without limitation, accessible on the Internet, whether this component has already been programmed. Reprogrammable cards can for example be given a special serial number allowing them to be recognized and thus authorizing multiple programming. According to another variation, the serial numbers of batches of reprogrammable cards can be flagged in the database so as to authorize several programmings of these cards.

Figure 15:
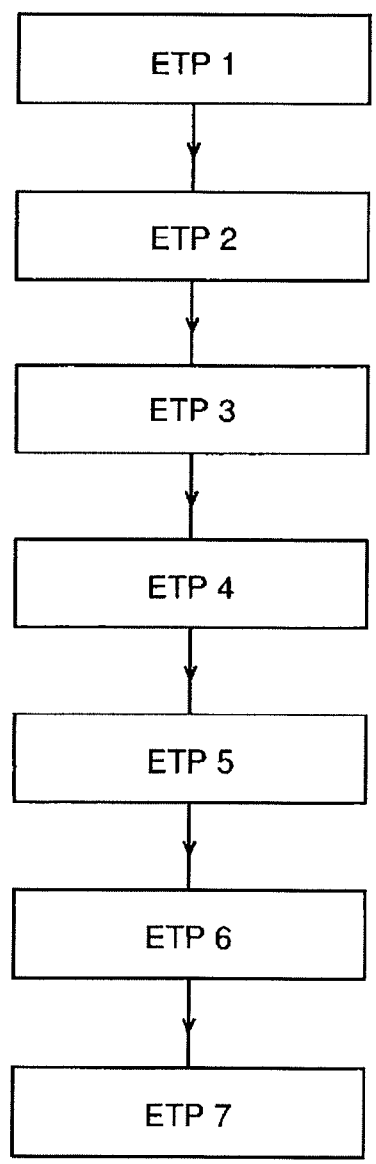
FIG. 15 shows the different operation steps of the portable object according to the invention.

Referring to FIG. 15, the use of the portable object (17) will now be presented with a Windows operating system.

Upon connection to the USB port of the computer host (ETP1), the portable object (17) is automatically recognized, by the operating system of the computer host, as a peripheral of the human interface device (HID) class, such as a keypad for example, during the USB enumeration phase, that is the phase during which the operating system identifies and configures the peripheral while giving it a unique address. To this end, when the computer terminal detects the connection of the portable object (17) to a USB port (ETP 2), by a variation of the voltage on pulldown resistors connected to the two power supply contacts, the latter issues a request (ETP 3) for the portable object to identify itself. The microcircuit provides the terminal a sequence of descriptors (ETP 4) such as for example the peripheral identifier (Peripheral ID) and/or the vendor identification (Vendor ID) and/or the product identifier (Product ID) using the identifiers stored in a memory space of the chip of the portable object (17), so as to identify the latter as a human interface device.

Once the portable object is identified as a human interface device (ETP 5), the terminal's operating system will assign it an address.

The microcircuit sends to the terminal a code sequence (ETP 6) simulating typing by the user on the keys corresponding to the keyboard shortcut allowing an application to be launched, that is to say the "Windows" key followed by the "r" key then the URL address or the command stored in a memory area of the chip of the portable object (17). By preference, unlike a conventional keypad, the object's program does not send to the terminal the key codes corresponding to the position of the different keys pressed which are then converted into ASCII code according to the type of keypad defined in the operating system. The program of the portable object sends directly the ASCII codes corresponding to the characters associated with the different virtually pressed keys. As a result, whatever the type of keypad defined in the operating system, the character string received by the operating system is always identical to that sent by the program of the portable object. Thus, for example, the character "a" will be correctly recognized by the terminal's operating system no matter what keyboard is used (AZERTY or QUERTY) and/or no matter what regional parameters are defined in the operating system. This makes it possible to prevent having an Internet address containing, for example the characters a, z, q or w from functioning correctly on certain terminals and not on others. This allows international use of the portable object (17) with the same programming.

According to another embodiment, the URL address or any other command that can be executed on a human interface device, is not stored in ASCII code but using a code conventionally used by the peripheral, such as for example in key codes in the case of a keypad type peripheral.

Once the instruction is received by the terminal's operating system, the latter interprets the information as a keyboard command typed by the user. The operating system of the terminal to which the portable object is connected can therefore open a browser (ETP 7) with the Internet page the address whereof was programmed into the chip, or execute the command. In the case of opening an Internet page, the user can directly gain access to an Internet without having to type the address or navigate the different pages of the site. This is all the more advantageous when the address is long and complicated to type. This also avoids the user becoming discouraged and giving up, for example as a result of error messages due to typing errors in the Internet address.

One advantage of the invention is that under Windows, that is the majority of the operating systems installed today, its use is very simple and it requires no installation of software or a driver on the terminal.

The portable object (17) is recognized as a human interface device, for example a keypad, by the terminal, and uses the drivers already installed in the operating system of the last mentioned. In addition, the portable object (17) does not launch any program of the auto-execute type that can be blocked by an antivirus program or does not open any window asking the user's consent to go on the pre-programmed Internet site.

Under the MacIntosh or Linux operating systems, the portable object (17) is not automatically recognized as a human interface device. Upon first using a portable object (17) according to the invention, the user will have to install a program or a driver so that the operating system recognizes portable objects (17) as peripherals of the human interface device type. This program can for example be downloaded from the Internet. Once the program is installed on the terminal, the use of the portable object (17) will be as simple as with the Windows operating system. It should be noted that the same program allows recognition of all portable objects (17). Thus it is not necessary to install a specific program for each portable object (17).

The program therefore has the object of allowing the operating system, MacIntosh or Linux, to identify the portable object (17) as a peripheral of the human interface device class. It also has the role of reading the information present in memory in the chip of the portable object, as for example the identifiers specific to the USB object such as for example the Vendor ID, the Product ID, the Device ID as well as the secret information contained in a memory of the chip such as for example the URL address of the page to which the terminal must connect or the command to be executed. Once the program has read, for example, the URL address encoded in ASCII code contained in the chip, it will convert that address and launch an Internet browser to open the Web page corresponding to the address.

The fact that the portable object does not execute any executable program, but only a keyboard command, also reduces the risk of a computer virus or other malicious program.

By opening the Internet page the portable object can also for example transmit an identifier stored in the memory space of the chip allowing identification of the user and/or the portable object on the visited page. It is to be noted that each portable object is unique and includes a unique serial number. This serial number can serve, for example, to form all or part of the user identifier thus creating a unique identifier. Moreover, so as to strengthen the identification, it will be possible to use the cryptographic arrangements present in the chip.

The invention also relates to an automated mass mailing preparation system.

The system can include an electrical and physical personalization unit, a document printing unit and a packaging unit.

The personalization unit is connected, for example, to computer arrangements and is supplied with blank cards previously inlaid with a module comprising connection arrangements and a chip by a card distributor for example. The personalization unit will carry out two types of personalization, an electrical personalization and a physical personalization. The electrical personalization will comprise, depending for example on data stored for example in a memory area of the computer means, the programming of the chip of the card. The operating program(s) of the microcircuit, the USB identifiers allowing the portable object to be recognized as a human interface device, the user identifier and the address of the Internet page to which the portable object must connect will be stored in a memory space of the chip. The physical personalization will comprise the pre-cutting of the personalizable outline of the portable object and the printing of an image and/or a text on at least part of the card.

A printing unit will comprise printing arrangements able to print, for example, a cover letter explaining, for example, the use of the portable object, its utility, its advantages . . . .

The packaging unit will assemble the letter, the card bearing the portable object and, for example the product ordered. The card can be, for example and without limitation, glued to the cover letter by means of a deposit of repositionable glue, clipped to the letter or the product or attached to the product using a tie extending into the cavity (22). The packaging unit will then pack everything for the purpose of dispatching it.

Unlike a conventional mass mailing process in the chip card industry, for example the sending of a banking card accompanied by its code or of a SIM (Subscriber Identity Module) accompanied by its PIN (Personal Identifier Number) code, in this process the secret information contained in the chip, to with the user identifier, is not transmitted to the recipient but rather remains secret. Only the issuer of the card contains the secret message stored in its chip.

According to another embodiment, the portable USB object (17) is associated, in a mass mailing for example, with a banking card. Thanks to a personalization machine having several programming heads, the banking card and the card (12) bearing the portable USB object are programmed at the same time and on the same machine. These two cards are later grouped on one and the same letter, for example glued by means of a repositionable glue and placed in an envelope. With this mass mailing, the recipient receives his banking card associated with the portable USB object allowing him to connect to the Internet page of his account without having to type the address or his identifier. All that is left for him to do is to enter his Internet password to manage his accounts on the Internet.

The portable object (17) eliminates the entry errors that could lead the user to a pirate site or a malicious site for example.

This card (12) allows the manufacture of the computer component (17) according to the manufacturing process of the invention.

Indeed, after manufacture of the card (12), the computer component (17) is formed by detaching the part (16) of the body (14) of the card.

Figure 8:
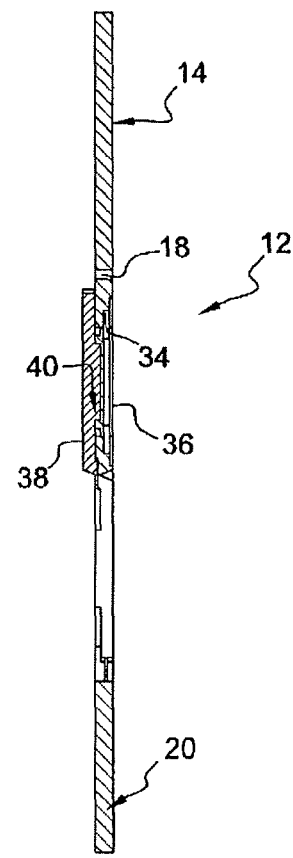
FIG. 8 is a section view along line VIII-VIII of FIG. 7 under representation conditions similar to those of FIG. 3.

Preferably, prior to detaching the part (16), the breakable bridge 48 is broken and the drop side (38) is folded onto the standing side (36), more particularly onto the substrate area (16A) of the standing side, so as to obtain the card (12) configuration shown in FIGS. 7 and 8. It will be noted that, in this configuration, the male snap element (42) is inserted into the female snap element (44) so as to firmly attach the drop side (38) to the standing side (36) in the position where this drop side (38) is folded onto the standing side (36).

The breakable thinned portion (46) is then broken so as to separate the standing side (36)-drop side (38) assembly from the part (20) of the body (14) of the card. The computer component (17) is then obtained as shown in FIGS. 9 through 11.

To facilitate the detachment of the area (16A), the portion (18B) of the linear slot can include a localized enlargement (49) for inserting a separation arrangement such as the end of a user's finger or of an appropriate tool.

Referring to the dimensions l, L and e shown in FIGS. 9 and 10, we have for example L=12 mm, L is greater than 11.75 mm and e=1.95 mm so that these dimensions are compatible with the USB standard.

In the configuration shown in FIGS. 9 through 11, the portable USB object (17) is capable of connecting to the conventional USB port of a computer host directly and without using specific equipment of the USB card reader type. Advantageously, the memory of the electronic chip contains software arrangements activating a function of the computer host upon connection of the computer component (17) to the matching connection arrangements borne by the computer host.

By way of example, the connection of the computer component 17 to the computer host can activate Internet browser software and automatically give access to a predetermined Internet page and transmit a user identifier.

The portable object (17) can, for example and without limitation, be associated with a mass mailing advertising campaign. The advertising mailing will include, in addition to the paper advertising material, a card (12) according to the present invention and will invite the recipient to connect his portable object (17) so as to have more information on the product(s) that are the subject of the advertisement. When the reader connects his portable object (17) and connects to the Internet site, the portable object (17) will transmit the user identifier associated with the card (12) to the Internet site. The advertiser can thus obtain a return on his mass mailing through the server of the site, which counts the identifiers of the same type. He can for example know the number of persons who have consulted the site following this mass mailing. As each portable object has a unique user identifier, the advertiser will know the identifier of the portable objects (17) that were connected to the site. Each identifier can, for example, be associated with a person or a batch of identifiers associated with a locality. The advertiser can have an accurate return regarding the effectiveness of his mass mailing. He can for example know who connected or which locality had the greatest number of connections and thus more accurately refocus his future campaigns.

According to another mode of use, the portable object (17) can, for example and without limitation, be associated with a journal or a magazine inviting the reader to connect his portable object to, for example and without limitation, by using a specific URL address, gain access to the digital articles published on the media site, contact the editorial staff, participate in the forum, gain access to the site of products the advertising whereof appears in the magazine . . . .

The card (12) can also be turned over upon purchase of a product. Before the turnover of the card, it will be programmed with a particular identifier corresponding to the person having purchased the product and a particular Internet address related to the purchased product. This identifier can serve, for example, for activating the guarantee of the purchased product and/or downloading the user instructions of the product. The Internet address programmed into the chip can, for example, direct the user, upon connection of the portable object (17) directly to the Internet after-sales service page of the purchased product. The purchaser can thus have the catalog numbers and/or order consumables and spare parts for the purchased product without having to type the address of the site or the catalog numbers of the purchased product. The purchaser can also gain access, for example, to a page providing videos of assembly or use of the purchased product that are more practical than on a paper medium. The vendor, for his part, can for example trace the purchased object thanks to the IP (Internet Protocol) connection address of the portable object.

Figure 17:
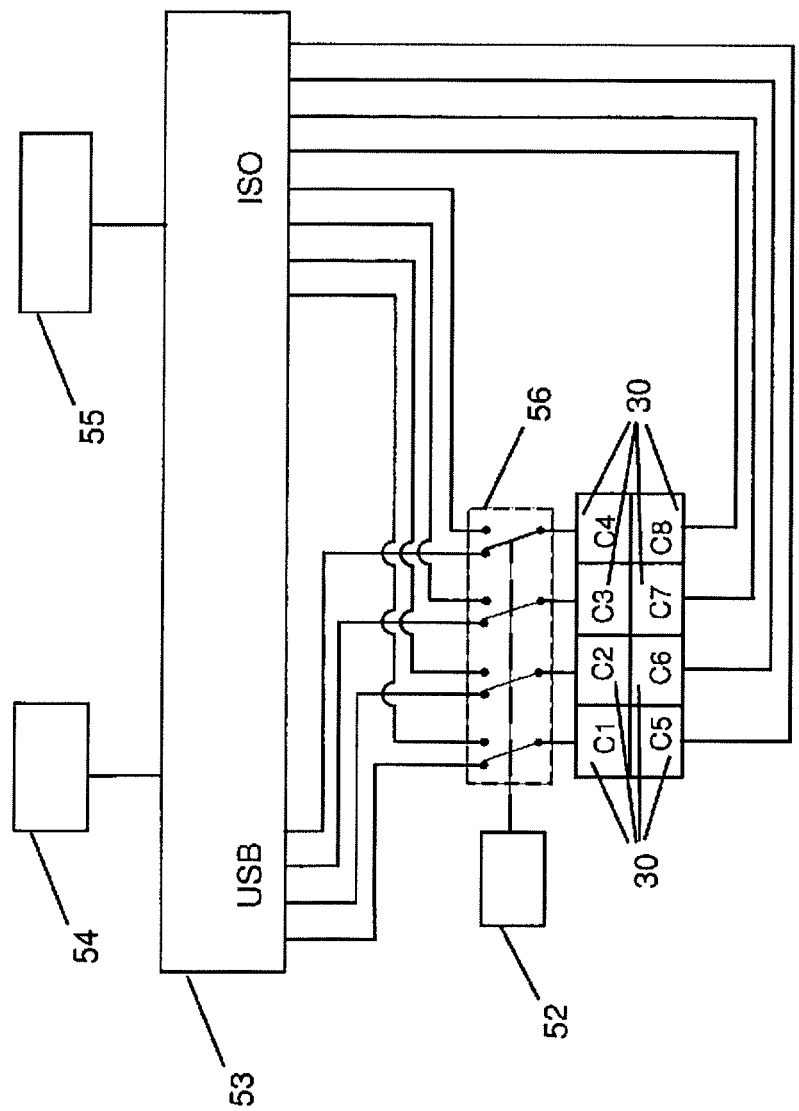
FIG. 17 is an example of implementation of cabling for a mixed card incorporating a chip card and a portable USB object.

According to another mode of use, the card can be a mixed card combining a conventional chip card and a portable USB object. FIG. 17 shows an example of cabling for such a card.

The chip includes a single microcircuit (53) capable of managing the USB and chip card operating modes, connected to a memory (55) and a clock circuit (54). This embodiment is in no way limiting and according to another variation in implementation the chip can include, for example, a microcircuit (53) specific to the operation of chip cards and a second microcircuit (53) specific to operation according to the USB standard. According to another embodiment, the clock circuit (54) can be integrated into a microcircuit (53). The chip can also include several memories.

In this embodiment, the chip includes arrangements (52) for selecting the type of operation of the card, in order to be able to operate on chip card readers or existing USB ports without problems and without modification to the last mentioned. The selection of the operating mode can, for example and without limitation, be carried out automatically by a microcircuit of the card by testing, for example and without limitation, the power supply mode of the circuit. If the device detects a power supply voltage between ISO contact C1 and C5, the card will operate in chip card mode and if it detects a power supply voltage between ISO contacts C1 and C4, the card will operate in USB mode. According to one variation of implementation the operating mode selection device (52) will be embodied by an activation button placed on the card and actuated by the user. This activation button can, for example, be embodied by a trace on the card on which the user must put his finger to activate it.

Each of the contact pads of the connection arrangements (30), corresponding to the ISO contacts C1 through C4, is connected to one input of a permutation device (56), such as for example a four-pole switch controlled by the operating mode selection device (52).

When the operating mode selection device (52) detects USB mode operation, it sends an electrical signal to the switch (56) so that it connects the contact pads with the cabling connected to the microcircuit (53) or the part of the microcircuit (53) managing the USB functions. Similarly, when chip card type operation is detected, the permutation device (56) connects the contact pads corresponding to ISO contacts C1 through C4 with the cabling connected to the microcircuit or the part of the microcircuit managing the chip card functions.

The contact pads corresponding to ISO contacts C5 through C8 are cabled to the microcircuit (53) or to the part of the microcircuit managing chip card operation.

The card can include a detachable portion designed to constitute a USB type computer component after cutting out this detachable portion. When the user wishes to use the portable object as a chip card, he will insert it into an adapter having the form of the matching part 20 of the card body.

The programming of the mixed card will take place in two steps. Firstly, the card will be programmed in ISO mode so as to store in memory the data necessary for the conventional chip card. Secondly, the card will be programmed in USB mode so as to enter the data needed for the portable USB object (17). By preference, this personalization will be carried out by a coupler, the program whereof will adapt the connector according to the type of programming to be performed.

It must be obvious to the persons skilled in the art that the present invention allows embodiments in numerous other specific forms without departing from the field of application of the invention as claimed. Consequently, the present embodiments must be considered to be by way of illustration, but can be modified within the field defined by the scope of the appended claims, and the invention must not be limited to the details given above.

The invention claimed is:

1. A card personalization device designed to generate a portable USB object, comprising a recognition device capable of recognizing a card operating according to the ISO standard and a card operating according to the USB standard and the recognition device is coupled to a device able to switch power supply terminals to contact pads corresponding to USB or ISO power supply contacts of the card depending on the type of card detected.

2. A device according to claim 1, wherein the recognition device has arrangements able to detect at least one slot on one area of the card.

3. A device according to claim 1 wherein the recognition device has arrangements able to detect the presence of a card inside the device.

4. A device according to claim 1, wherein recognition of the type of card is performed through a coupler by analyzing the response of the microcircuit, on at least one contact pad of the connection arrangements of the card, consequent to a particular mode of power supply to the microcircuit.

5. A device according to claim 1, including a card loader, wherein the personalization device includes arrangements for programming the microcircuit of the card, arrangements for cutting out a personalized outline in the card and printing arrangements.

6. A device according to claim 5, wherein the card personalization device is able to program the chip of the card, to adapt the personalized outline according to a file stored in a memory and to carry out personalized printing matching at least the outline over at least part of the card, automatically.

7. A device according to claim 5 wherein the cutting-out arrangements are milling or punching arrangements.

8. A device according to claim 5, wherein the cutting-out arrangements are associated with suction arrangements.

9. A device according to claim 5, wherein the cutting-out arrangements are controlled by computer arrangements, the cutting-out arrangements being able to make a personalized outline based on a particular command file.

10. A card designed to constitute a portable USB object comprising a pre-cut detachable portion designed to form a portable object of the USB type, the detachable portion being including at least one microcircuit, a secure nonvolatile memory space, a clock circuit and connection arrangements, the memory space including at least one identifier designed to identify the USB product as being of the human interface device (HID) type, a predetermined URL address or another command executable by a human interface device, written in ASCII code, an identifier designed to be transmitted with the URL address so as to identify the user, the portable object being, after cutting out the detachable portion, connectable to a USB port to be made operational without addition of specific reader equipment, the detachable portion including arrangements embodying a fold line, the fold line separating two areas called a standing side and a drop side, such that, after cutting out the detachable portion and folding the detachable portion by folding the drop side onto the standing side, the portable object is connectable so as to be made operational.

11. A card according to claim 10, the card having an arrangement for selecting chip card mode or USB mode operation, at least a dual cabling arrangement, one compatible with the USB type, the other with the ISO type, between the contact pads of the connection arrangements of the card and the microcircuit(s) and arrangements making it possible to switch signals over one of the two cables according to ISO type or USB type operating mode.

12. A card according to claim 10, wherein the standing side and the drop side are provided with matching means for firmly attaching them to one another, preferably of the snap-action type, activated after folding the drop side onto the standing side.

13. A card according to claim 10, wherein the connection arrangements of the card are embodied by a contact pads layout with eight contacts in ISO 7816 format, each contact pad being electrically isolated from the others, and the length of four contact pads is extended so as to correspond with the length of USB type connection arrangements.

14. A card according to claim 10, wherein the detachable portion is bounded by a linear slot in the body of the card interrupted by breakable connection arrangements connecting the detachable portion with a portion of the body of the card matching the detachable portion.

15. A card according to claim 10, wherein the connection arrangements of the card have dimensions and a location compatible with the ISO 7816 standard.

16. A card according to claim 10, wherein the card has a length and a width complying with the ISO 7816 standard and a thickness measured at the periphery greater than or equal to 1 mm.

17. An automatic mass mailing process including a step for electrical or physical personalization of a chip card according to claim 10, designed to generate a portable USB object, comprising at least the programming of unique and secret information into a memory area of the chip, a step for associating the card with at least one mass mailing letter and a dispatch step wherein the secret information contained in the chip is not revealed to the recipient, but allows direct access to an Internet site upon connection of the portable USB object, via a USB port, to a computer host connectable to the Internet.

18. Process for detecting a USB type card, said process being implemented by a programming coupler, the process comprises:
   supplying power to a microcircuit in ISO mode;
   resetting to zero and awaiting for an Answer to Reset (ATR) response;
   supplying power to the microcircuit in USB mode; and
   requesting an identifier specific to USB products, written into a memory of the microcircuit during its manufacture.

19. Process according to claim 18, wherein the programming coupler supplies power to the card in ISO mode at contacts and delivers the data on the corresponding ISO contact in the case of the ATR response or supplies power at USB contacts and delivers the URL address data and the information identifying the USB product as being of the human interface device type to the microcircuit at contacts.

* * * * *